(12) United States Patent
Chan

(10) Patent No.: US 6,355,911 B2
(45) Date of Patent: Mar. 12, 2002

(54) METHOD OF SECURING ARTICLES AND AN ELECTRIC KETTLE MADE BY SUCH A METHOD

(75) Inventor: Tat Chan, New Territories (HK)

(73) Assignee: Better Electrical Products (UK) Company Limited (HK)

( * ) Notice: Subject to any disclaimer, the term of this patent is extended or adjusted under 35 U.S.C. 154(b) by 0 days.

(21) Appl. No.: 09/852,023

(22) Filed: May 10, 2001

(30) Foreign Application Priority Data

May 31, 2000 (GB) .............................................. 0013205

(51) Int. Cl.⁷ .......................... A47J 27/21; G01F 23/02
(52) U.S. Cl. .......................... 219/438; 99/285; 73/334; 73/326; 116/227
(58) Field of Search ................................ 219/438, 429, 219/432, 433, 437; 99/279, 285; 222/146.1, 146.2, 146.5, 146.6; 73/323, 325, 326, 328, 334; 116/227, 276

(56) References Cited

U.S. PATENT DOCUMENTS 3,968,688 A * 7/1976 Eaton et al. .................. 73/328
4,169,309 A * 10/1979 Meginnis ...................... 73/334
4,365,143 A * 12/1982 Kerber, Jr. ................... 219/437
5,210,658 A * 5/1993 Foster .......................... 73/323
5,655,341 A * 8/1997 Jaffiol et al. ............. 52/204.54

FOREIGN PATENT DOCUMENTS

GB 2155757 A 10/1985

* cited by examiner

Primary Examiner—Joseph Pelham
(74) Attorney, Agent, or Firm—Burns, Doane, Swecker & Mathis, L.L.P.

(57) ABSTRACT

There is disclosed a method of securing a stainless steel housing (12) for a kettle (10), a polypropylene or polycarbonate water gauge (14), and a polypropylele or polycarbonate backing element (16A, 16B, 16C, 16D, 16E), including the steps of (a) welding the water gauge (14) with the backing element (16A, 16B, 16C, 16D, 16E); (b) contacting and fixedly securing the housing (12) with the water gauge (14); and (c) positioning a silicon rubber sealing ring (18A, 18B, 18C, 18D, 18E, 18F) between and in contact with the housing (12) and the backing element (16A, 16B, 16C, 16D, 16E) to thereby form a water-tight seal therebetween.

30 Claims, 16 Drawing Sheets

METHOD OF SECURING ARTICLES AND AN ELECTRIC KETTLE MADE BY SUCH A METHOD

This application claims priority under 35 U.S.C. §§ 119 and/or 365 to 0013205.0 filed in the United Kingdom on May 31, 2000; the entire content of which is hereby incorporated by reference.

FIELD OF THE INVENTION

This invention relates to a method of securing a plurality of articles, and an electric kettle made by such a method. Such an invention relates more particularly to the provision of an electric kettle with a water gauge.

BACKGROUND OF THE INVENTION

There are in existence a larger variety of electric kettles. Most such electric kettles do not include any water gauge whereby a user may inspect the amount of water in the kettles. In particular, in electric kettles having a metal housing, it has not thus far been technically feasible to incorporate a water gauge which, in order to be non-opaque to allow inspection of the interior of the housing, has to be made of a plastics material. However, given the repeated heating up and cooling down of the electric kettle, there exists the problem of ensuring that the engagement between the water gauge and the metal housing is water-tight.

It is thus an object of the present invention to provide a method of securing a plurality of articles, and an electric kettle made by such a method, in which the above shortcomings are mitigated.

SUMMARY OF THE INVENTION

According to a first aspect of the present invention, there is provided a method of securing at least a first, a second, and a third article, wherein said first article is made of a metal, and said second and third articles are made of a plastics material, wherein said method includes the steps of (a) fixedly securing said second article with said third article; (b) contacting and fixedly securing said first article with said second article; characterized in including a step of (c) positioning a sealing member between and in contact with said first, second and third articles to thereby form a water-tight seal therebetween.

According to a second aspect of the present invention, there is provided an electric kettle including a metal housing member for containing water, a non-opaque water gauge and a backing member made of a plastics material, wherein said water gauge and said backing member are fixedly secured with each other, wherein said housing member contacts and is fixedly secured with said water gauge, characterized in that a sealing member is positioned between and in contact with said housing member, said backing member and said water gauge to thereby form a water-tight seal therebetween.

BRIEF DESCRIPTION OF THE DRAWINGS

Preferred embodiments of the present invention will now be described, by way of examples, and with reference to the accompanying drawings, wherein.

DETAILED DESCRIPTION OF THE PREFERRED EMBODIMENTS

Figure 1:
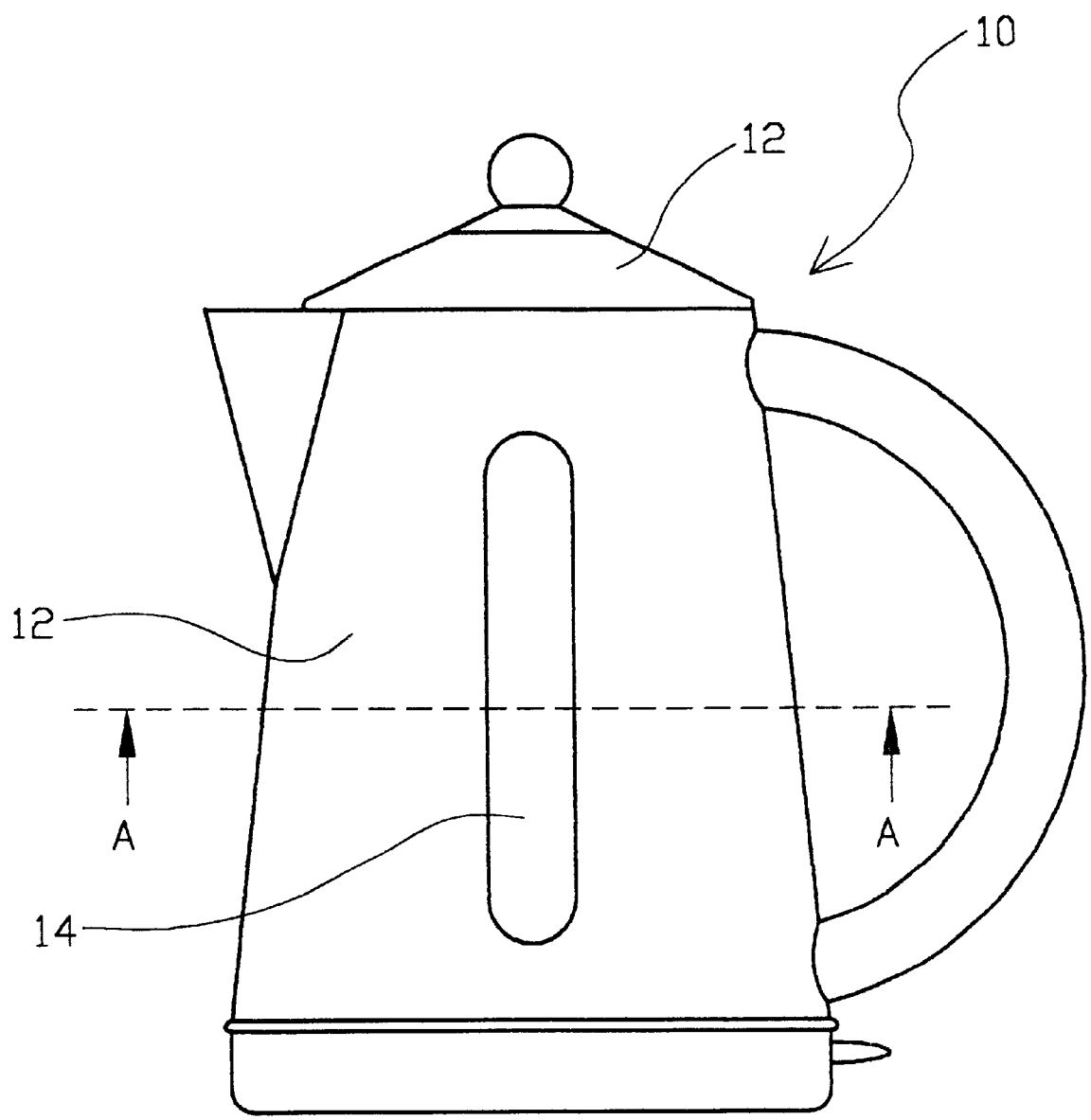
FIG. 1 shows a side view of an electric kettle according to the present invention.

An electric kettle made in accordance with the present invention is shown in FIG. 1 as generally designated as 10. The kettle 10 includes a lid releasably engageable with a stainless steel body 12 for containing liquid (e.g. water) to be boiled. Provided on the body 12 is a non-opaque (e.g. transparent) plastics water gauge 14 through which a user may inspect the level, and thus the amount, of water in the body 12. The water gauge 14 may include an index or scale for indicating the amount of water in the body 12 of the kettle 10. The water gauge 14 may be made of polypropylene or polycarbonate. In order to ensure that the engagement between the water gauge 14 and the body 12 is water-tight, eight different arrangements are provided.

Figure 2A:
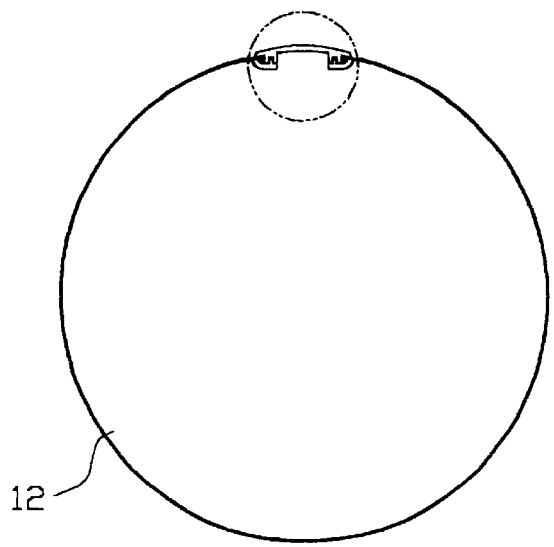
FIG. 2A shows a cross-sectional view of a first type of securing arrangement according to the present invention, taken along the line A—A of FIG. 1.
Figure 2B:
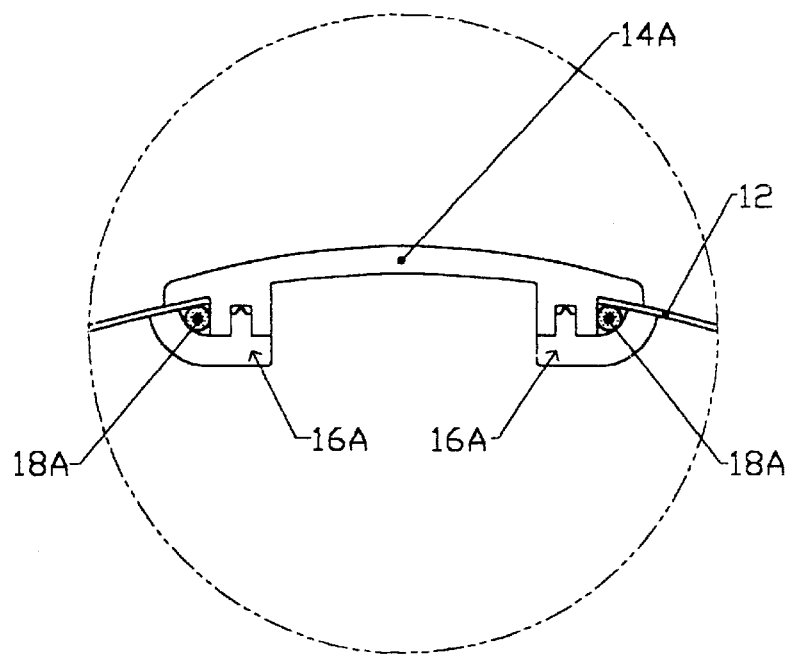
FIG. 2B shows an enlarged view of the encircled portion shown in FIG. 2A.
Figure 2C:
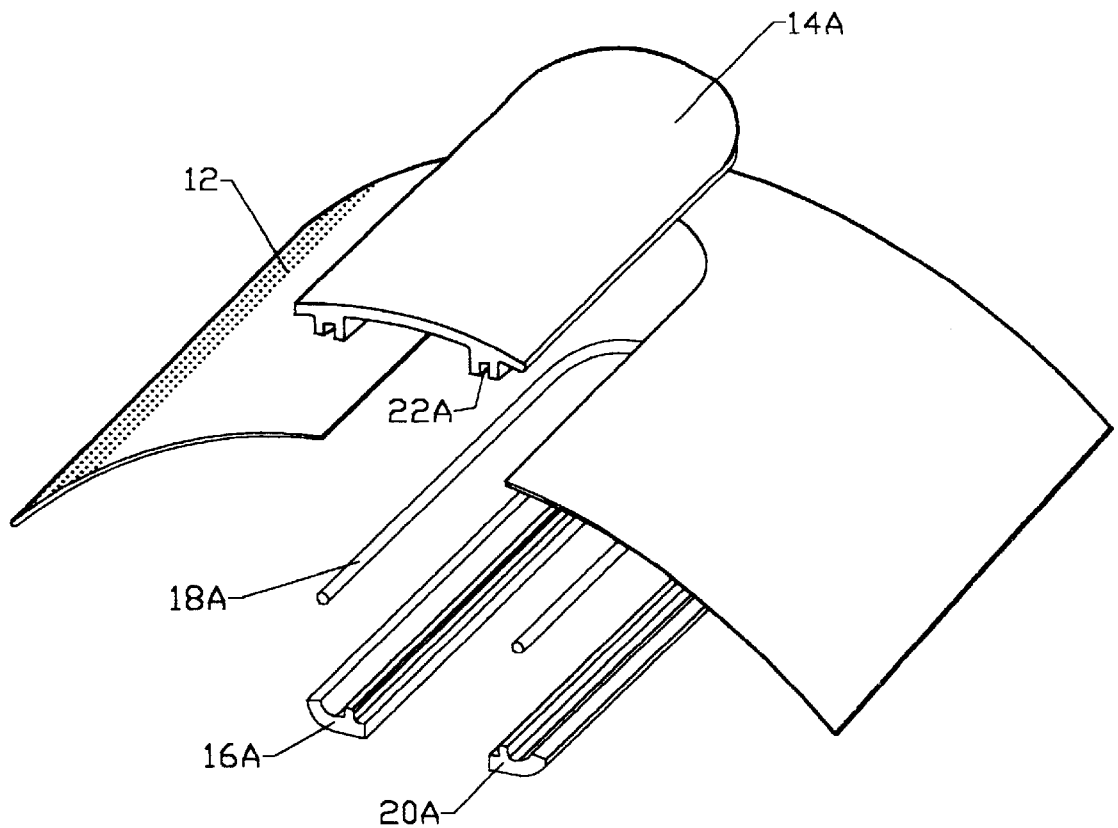
FIG. 2C shows an exploded view of the parts shown in FIG. 2B.

According to the first arrangement, and as shown in FIGS. 2A to 2C, the stainless steel body 12 is secured with both a first type of water gauge 14A, a first type of backing element 16A, and a first type of sealing ring 18A to form a water-tight seal. The backing element 16A may be made of polypropylene or polycarbonate. If both the water gauge 14A and the backing element 16A are made of polypropylene, they may be fixedly secured with each other by high-frequency welding or hot-plate welding. If both of them are made of polycarbonate, they may be fixedly secured with each other by high-frequency welding, hot-plate welding or ultra-sonic welding. The endless silicon rubber sealing ring 18A is positioned among and in contact with the housing 12, the water gauge 14A and the backing element 16A. The silicon rubber sealing ring 18A is circular in cross section. It can be seen that the backing element 16A includes a ridge 20A which is received within a channel 22A of the water gauge 14A.

Figure 3A:
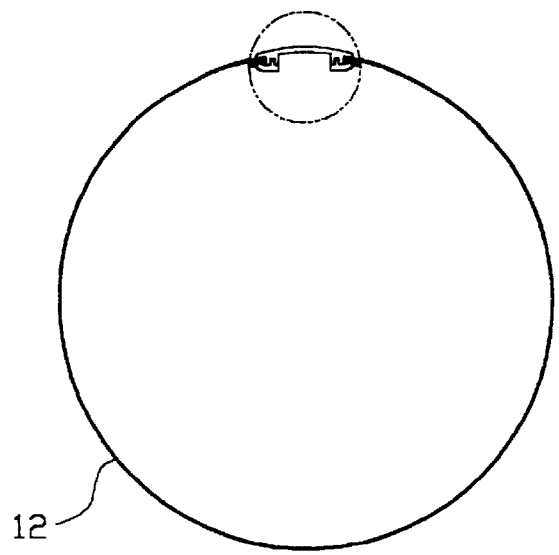
FIG. 3A shows a cross-sectional view of a second type of securing arrangement according to the present invention, taken along the line A—A of FIG. 1.
Figure 3B:
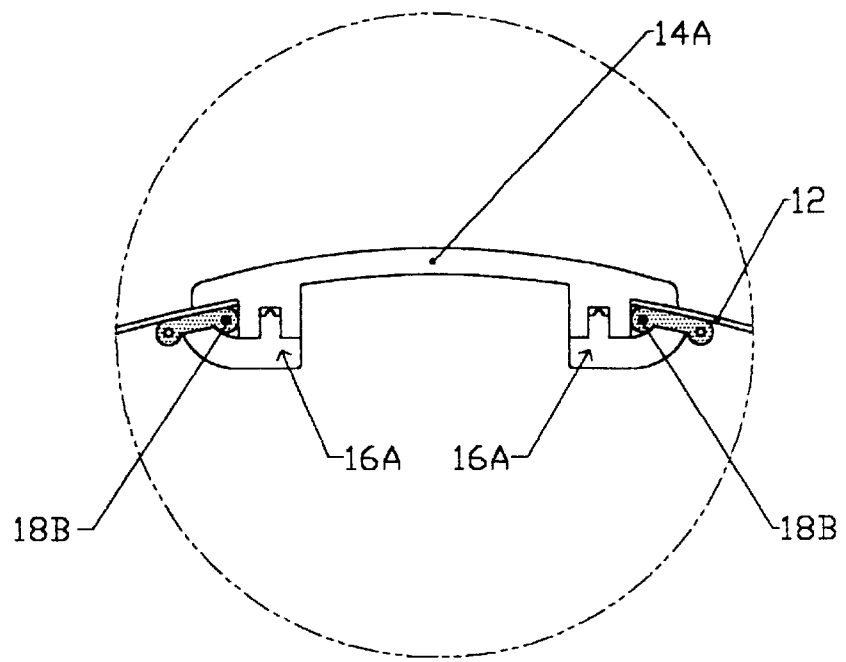
FIG. 3B shows an enlarged view of the encircled portion shown in FIG. 3A.
Figure 3C:
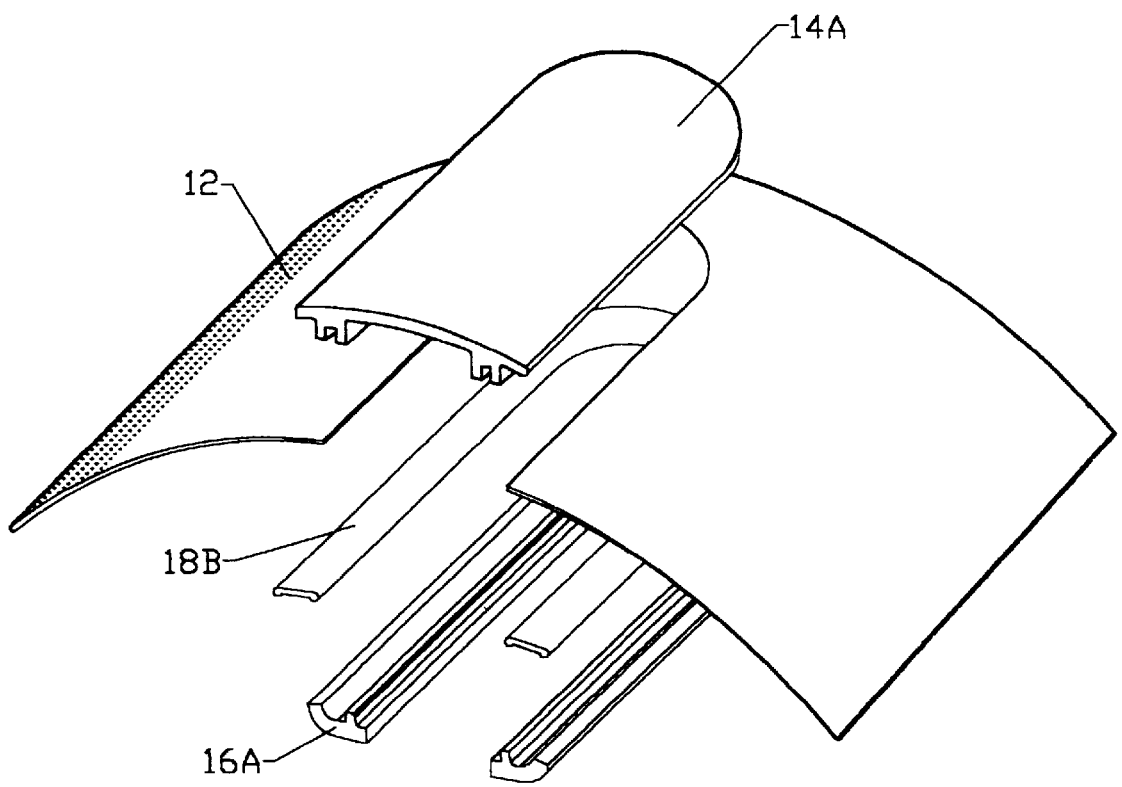
FIG. 3C shows an exploded view of the parts shown in FIG. 3B.

FIGS. 3A to 3C show a second arrangement whereby the stainless steel body 12 is fixedly secured with both the first type of water gauge 14A and the first type of backing element 16A, to form a water-tight seal. The main difference in this arrangement is a sealing ring 18B. This sealing ring 18B is elongate in cross section with two flat surfaces. It can be seen in FIG. 3B that one flat surface abuts an inner surface of the steel body 12, while another flat surface abuts the backing element 16A.

Figure 4A:
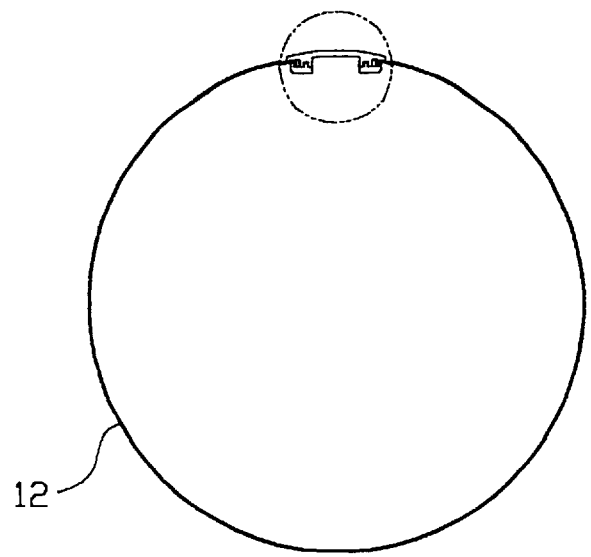
FIG. 4A shows a cross-sectional view of a third type of securing arrangement according to the present invention, taken along the line A—A of FIG. 1.
Figure 4B:
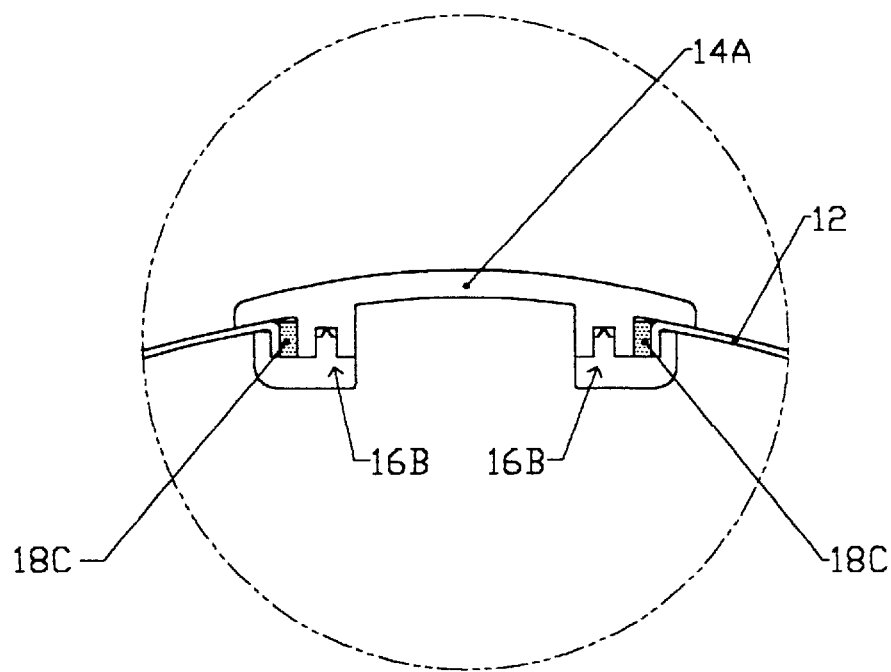
FIG. 4B shows an enlarged view of the encircled portion shown in FIG. 4A.
Figure 4C:
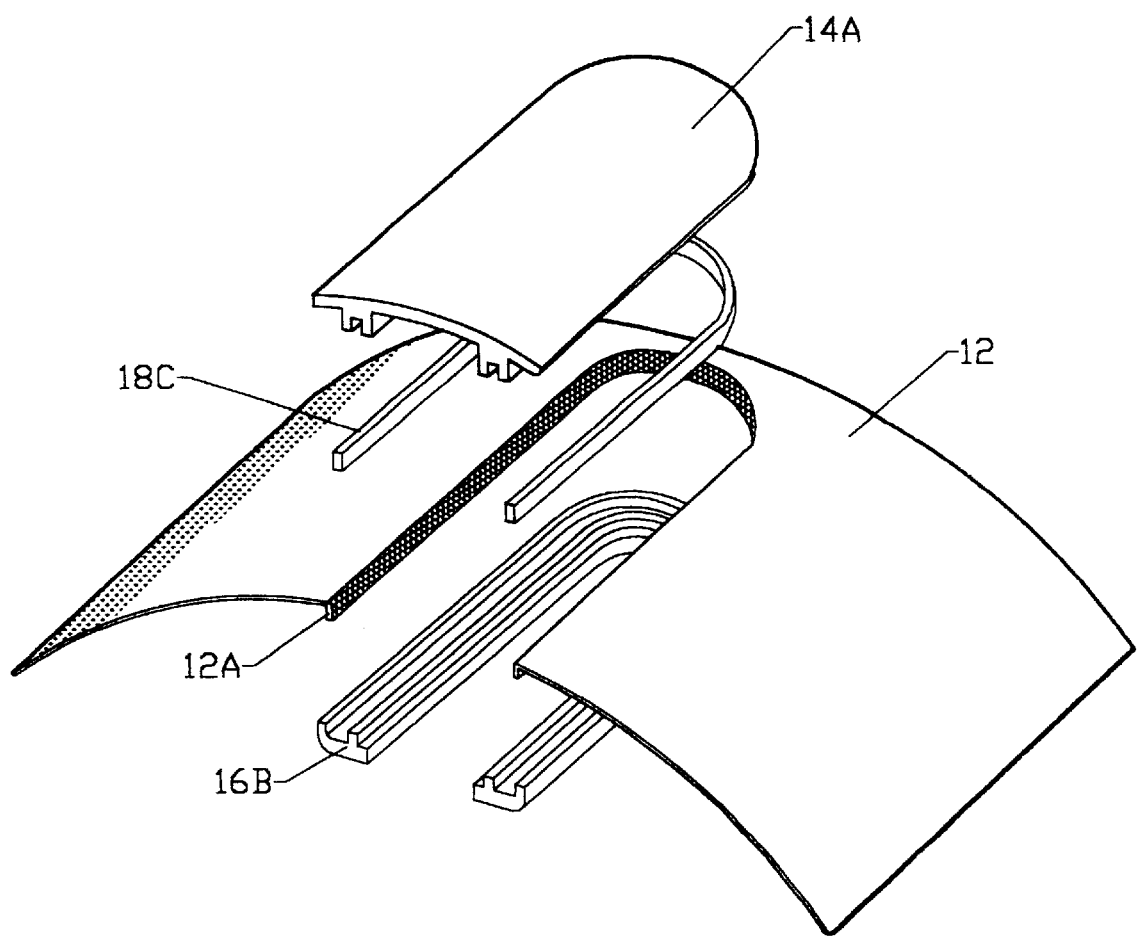
FIG. 4C shows an exploded view of the parts shown in FIG. 4B.

FIGS. 4A to 4C show a third arrangement whereby the stainless steel body 12 is fixedly secured with the first type of water gauge 14A, a second type of backing element 16B and a third type of sealing ring 18C, to form a water-tight seal. In this arrangement, the portion of the body 12 to be engaged with the backing element 16B is bent. This bent portion 12A is received within a cavity between the water gauge 14A, the backing element 16A and the sealing ring 18C. As can be seen, the sealing ring 18C is substantially rectangular in cross-section, and is in contact with the water gauge 14A, the backing element 16A and the bent portion 12A of the body 12.

Figure 5A:
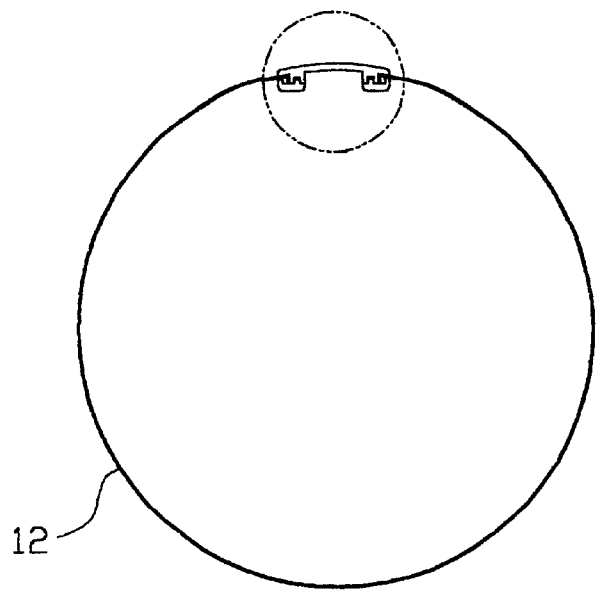
FIG. 5A shows a cross-sectional view of a fourth type of securing arrangement according to the present invention, taken along the line A—A of FIG. 1.
Figure 5B:
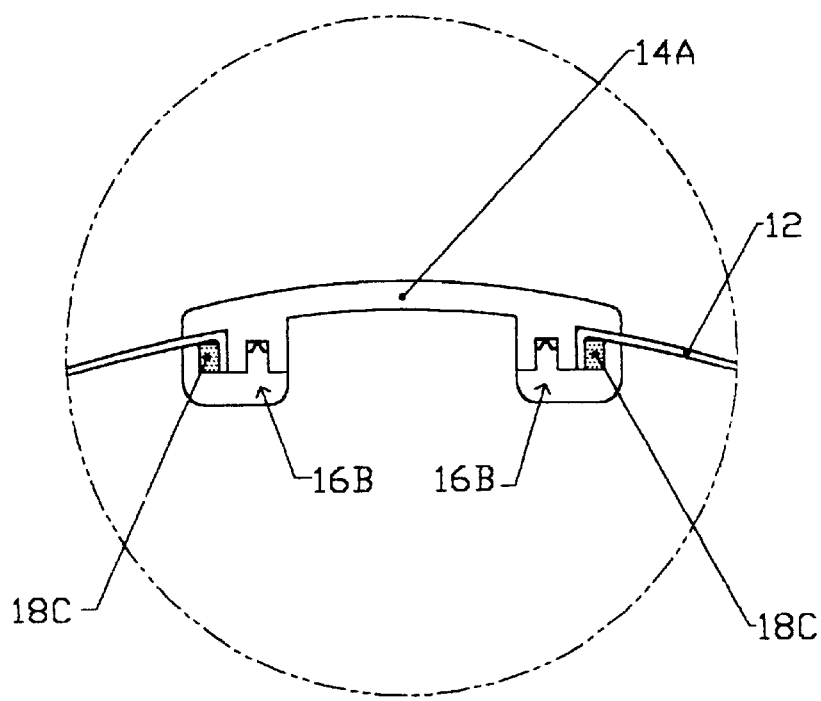
FIG. 5B shows an enlarged view of the encircled portion shown in FIG. 5A.
Figure 5C:
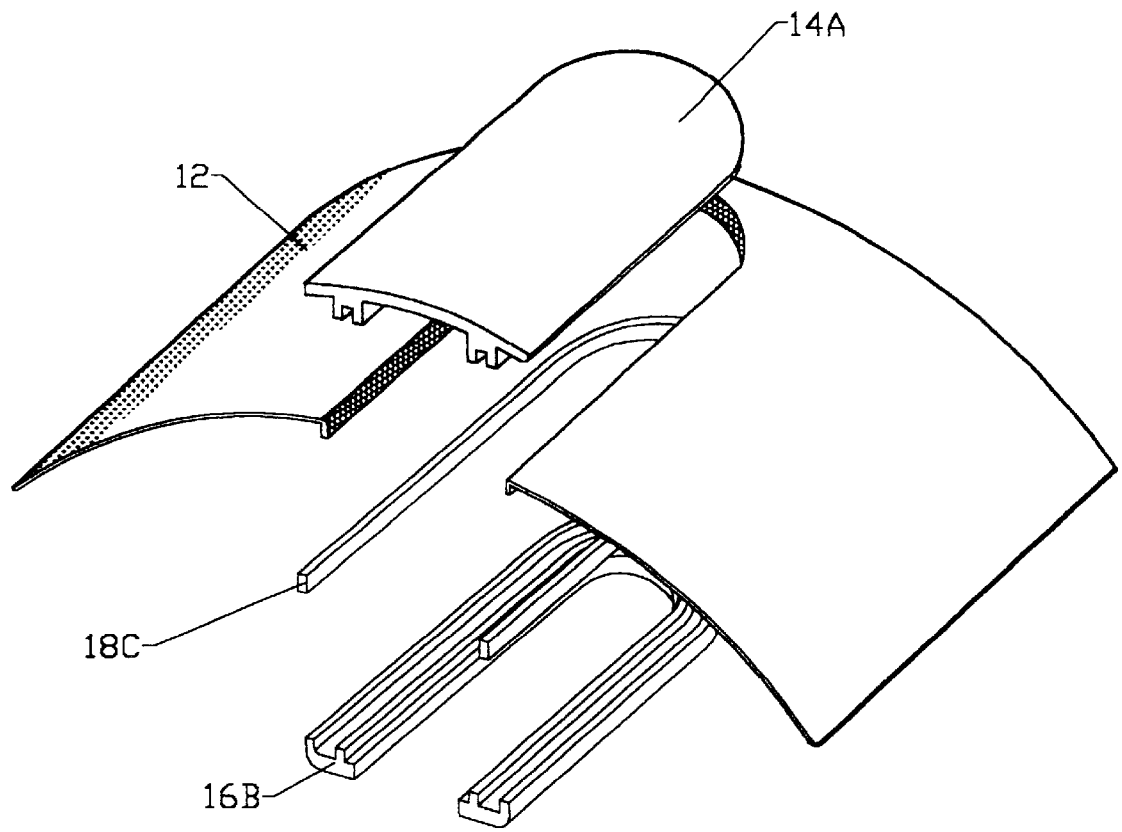
FIG. 5C shows an exploded view of the parts shown in FIG. 5B.

FIGS. 5A to 5C show a fourth arrangement whereby the stainless steel body 12 is fixedly secured with the first type of water gauge 14A, the second type of backing element 16B and the sealing ring 18C, to form a water-tight seal. In the arrangement shown in FIGS. 4A to 4C, the sealing ring 18C is in contact with the outer surface of the body 12, the water gauge 14A and the backing element 16B, whereas in the arrangement shown in FIGS. 5A to 5C, the sealing ring 18C is in contact with the inner surface of the body 12 and the backing element 16B, but is out of contact with the water gauge 14A.

Figure 6A:
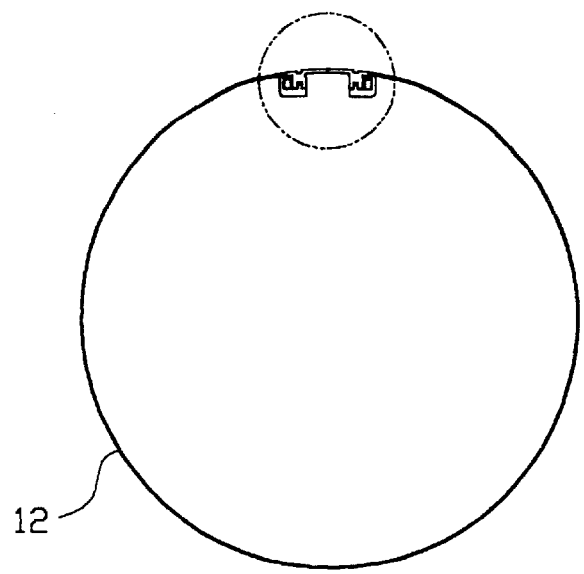
FIG. 6A shows a cross-sectional view of a fifth type of securing arrangement according to the present invention, taken along the line A—A of FIG. 1.
Figure 6B:
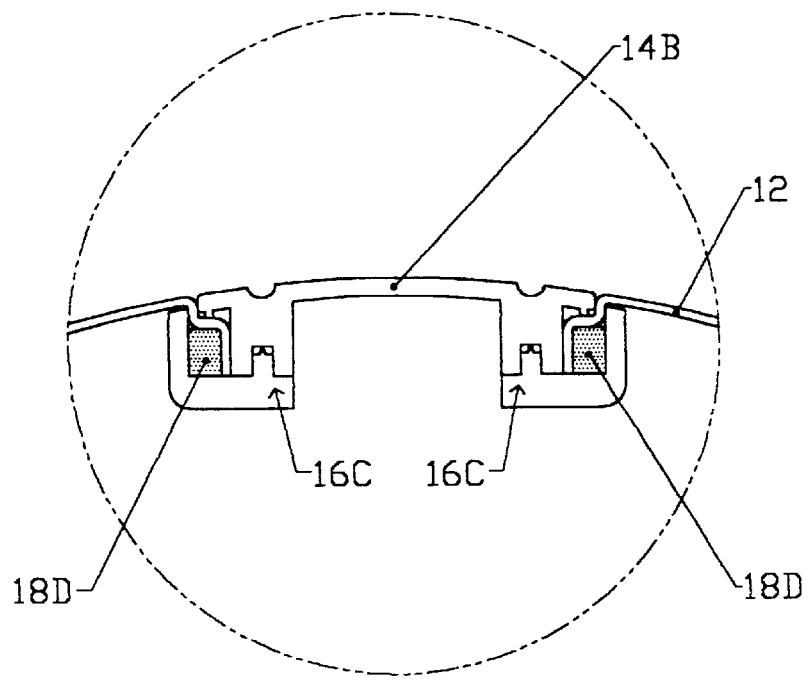
FIG. 6B shows an enlarged view of the encircled portion shown in FIG. 6A.
Figure 6C:
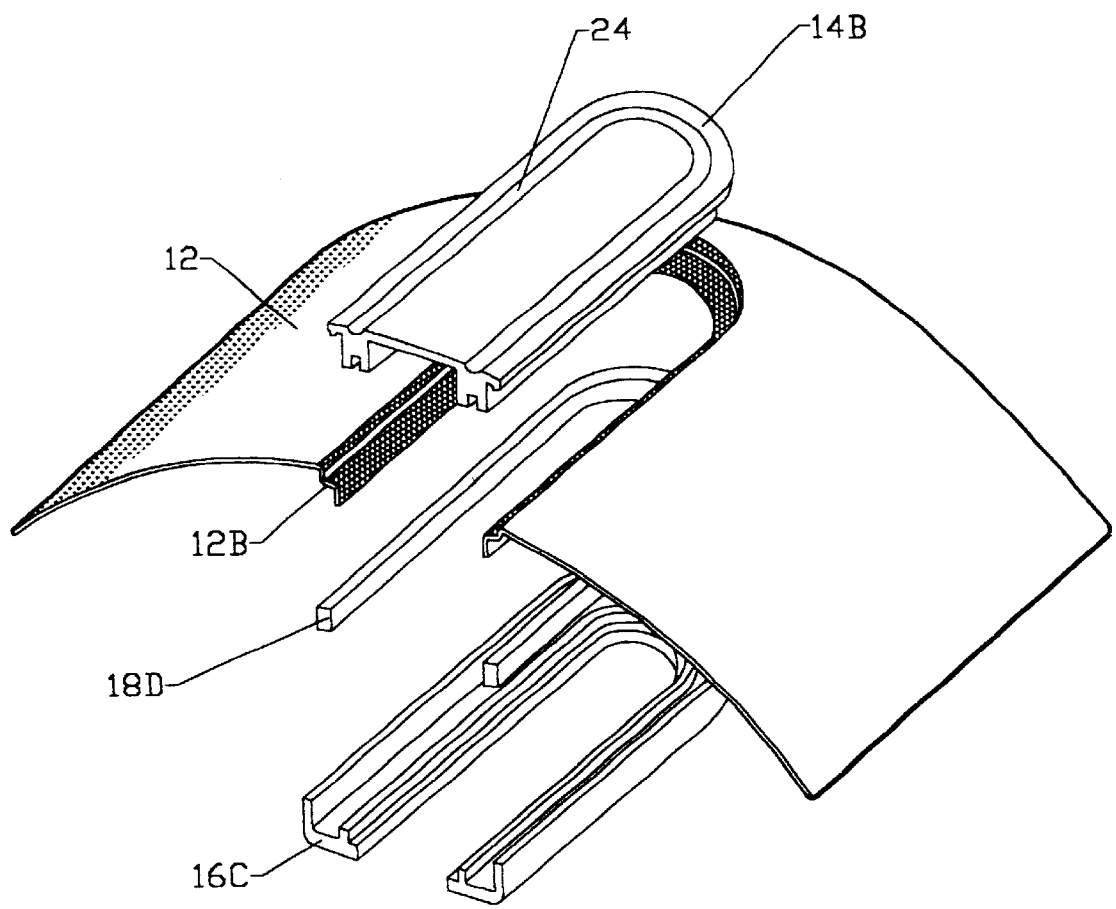
FIG. 6C shows an exploded view of the parts shown in FIG. 6B.

FIGS. 6A to 6C show a fifth arrangement whereby the stainless steel body 12 is fixedly secured with a second type of water gauge 14B, a third type of backing element 16C and a fourth type of sealing ring 18D, to form a water-tight seal. It can be seen in particular that the body 12 includes a stepped portion 12B, which is engaged with, and is received within a cavity among, the water gauge 14B, the backing element 16C and the sealing ring 18D. To enhance the aesthetic appearance of the water gauge 14B, a recess 24 is formed on the outer surface of the water gauge 14B.

Figure 7A:
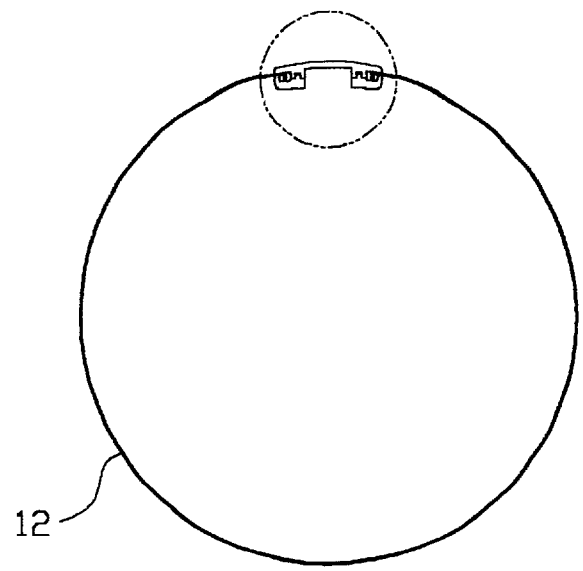
FIG. 7A shows a cross-sectional view of a sixth type of securing arrangement according to the present invention, taken along the line A—A of FIG. 1.
Figure 7B:
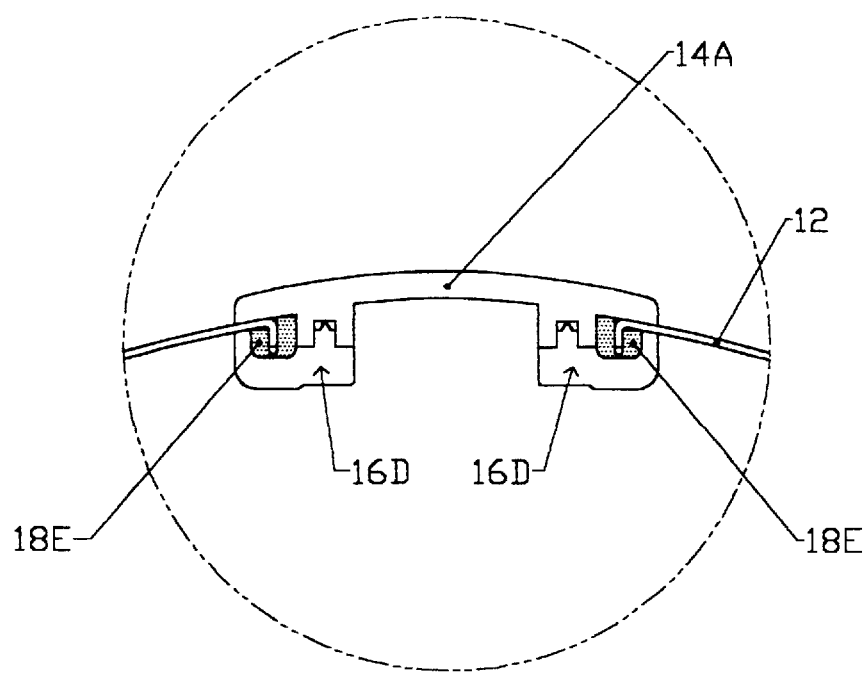
FIG. 7B shows an enlarged view of the encircled portion shown in FIG. 7A.
Figure 7C:
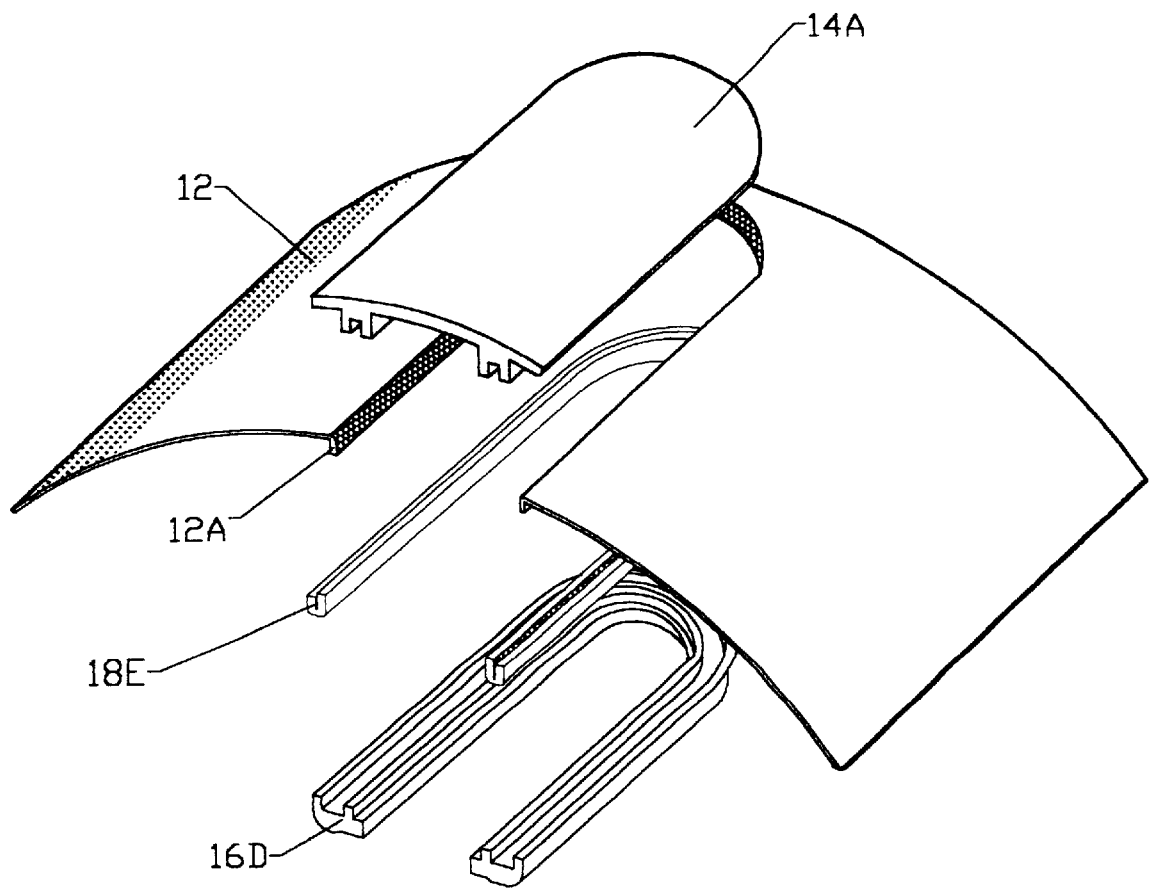
FIG. 7C shows an exploded view of the parts shown in FIG. 7B.

Turning to FIGS. 7A to 7C, such show a sixth arrangement whereby the housing 12 is fixedly secured with the first type of water gauge 14A, a fourth type of backing element 16D and a fifth type of sealing ring 18E, to form a water-tight seal. In this arrangement, the sealing ring 18E includes two arms and is of a substantially U-shaped cross section. The bent portion 12A of the housing 12 is received within the cavity between the arms of the sealing ring 18E.

Figure 8A:
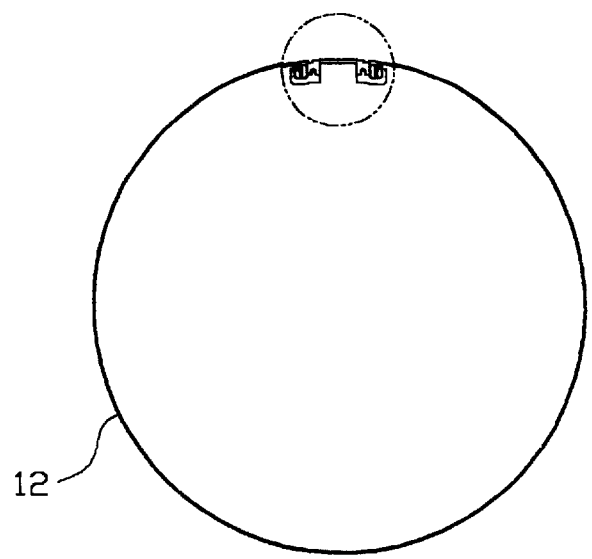
FIG. 8A shows a cross-sectional view of a seventh type of securing arrangement according to the present invention, taken along the line A—A of FIG. 1.
Figure 8B:
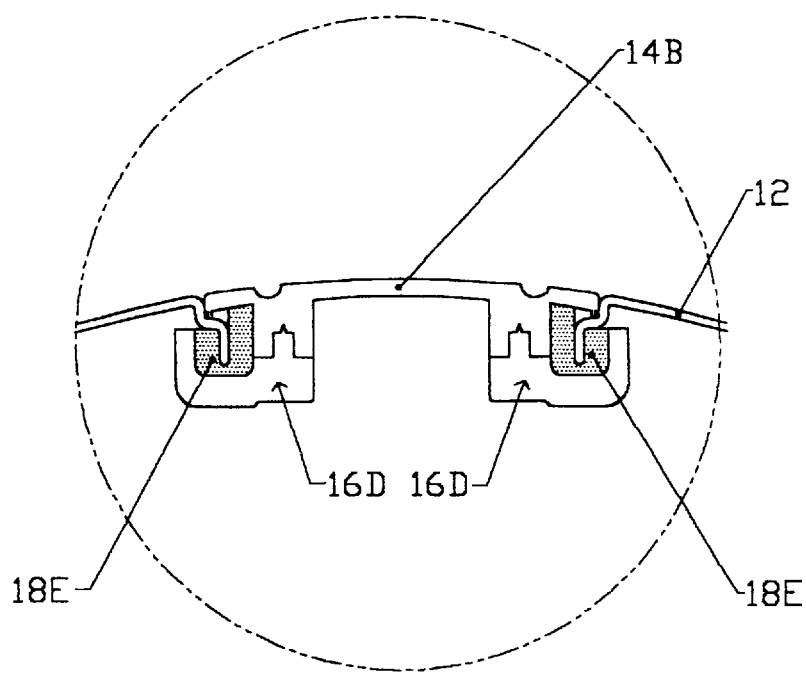
FIG. 8B shows an enlarged view of the encircled portion shown in FIG. 8A.
Figure 8C:
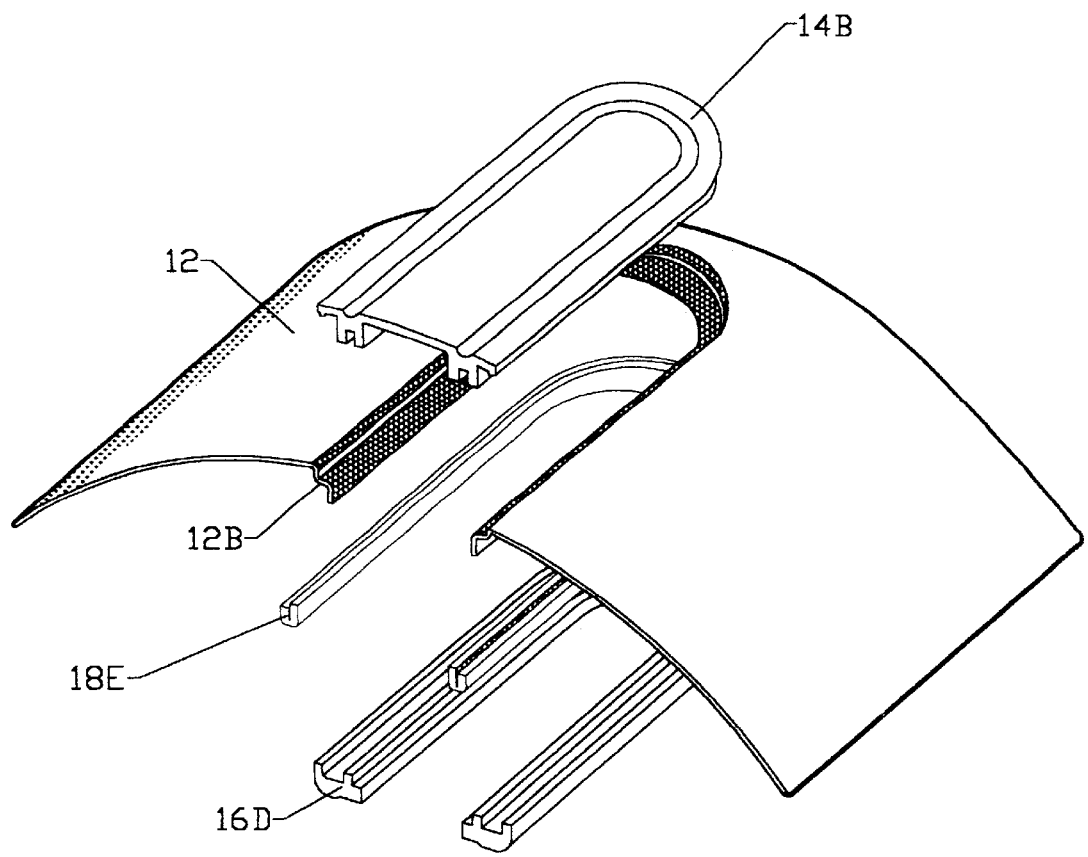
FIG. 8C shows an exploded view of the parts shown in FIG. 8B.

FIGS. 8A to 8C show a seventh arrangement whereby the housing 12 is fixedly secured with the second type of water gauge 14B, the fourth type of backing element 16D, and the fifth type of sealing ring 18E, to form a water-tight seal. In this arrangement, the housing 12 includes a stepped portion 12B, which is received within the cavity between the arms of the sealing ring 18E.

Figure 9:
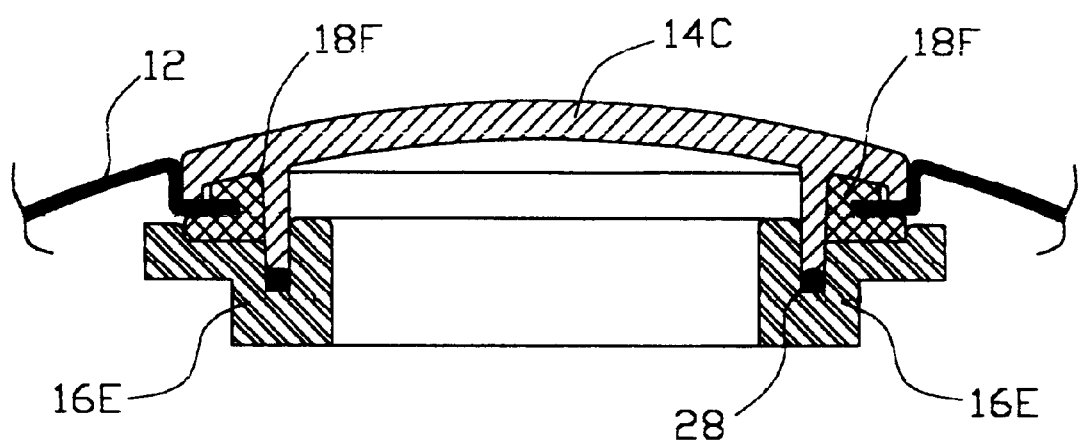
FIG. 9 shows an enlarged view of an eighth type of securing arrangement according to the present invention.

Turning now to FIG. 9, such shows an eighth arrangement whereby the housing 12 is fixedly secured with a third type of water gauge 14C, a fifth type of backing element 16E, and a sixth type of sealing ring 18F, to form a water-tight seal. In this arrangement, the sealing ring 18F is also substantially U-shaped in cross-section, and receives a bent portion of the housing 12 sidewardly. In addition, an iron wire ring 28 is positioned between the water gauge 14C and the backing element 16E.

What is claimed is:

1. A method of securing at least a first, a second, and a third article, wherein said first article is made of a metal, and said second and third articles are made of a plastics material, wherein said method includes the steps of:
   (a) fixedly securing said second article with said third article;
   (b) contacting and fixedly securing said first article with said second article; characterized in including a step of
   (c) positioning a sealing member between and in contact with said first, second and third articles to thereby form a water-tight seal therebetween.

2. A method according to claim 1 further characterized in that said sealing member includes an endless silicon rubber sealing ring.

3. A method according to claim 1 further characterized in that said metal is stainless steel.

4. A method according to claim 1 further characterized in that said plastics material is polypropylene.

5. A method according to claim 4 further characterized in that said second and third articles are fixedly secured to each other by high frequency welding or hot-plate welding.

6. A method according to claim 1 further characterized in that said plastics material is polycarbonate.

7. A method according to claim 6 further characterized in that said second and third articles are fixedly secured to each other by high frequency welding, hot-plate welding or ultra-sonic welding.

8. A method according to claim 1 further characterized in including the steps of:
   (d) forming at least a channel member on said second article;
   (e) forming at least a ridge member on said third article; and
   (f) placing said ridge member of said third article in said channel member of said second article.

9. A method according to claim 1 further characterized in including the steps of:
   (g) forming at least a bent portion on said first article; and
   (h) placing said bent portion of said first article within a cavity formed between said second and third articles.

10. A method according to claim 1 further characterized in including the steps of:
    (i) forming at least a stepped portion on said first article; and
    (j) placing said stepped portion of said first article within a cavity formed between said second and third articles.

11. A method according to claim 2 further characterized in that said sealing ring is substantially circular in cross section.

12. A method according to any claim 2 further characterized in that said sealing ring is substantially rectangular in cross section.

13. A method according to claim 2 further characterized in that said sealing ring is substantially U-shaped in cross section with two arm members.

14. A method according to claim 13 further characterized in including the steps of:
(k) forming at least a bent portion on said first article; and
(l) placing said bent portion of said first article in a space between the arm members of said sealing ring.

15. A method according to claim 13 further characterized in including the steps of:
(m) forming at least a stepped portion on said first article; and
(n) placing said stepped portion of said first article in a space between the arm members of said sealing ring.

16. An electric kettle including a metal housing member for containing water, a non-opaque water gauge and a backing member made of a plastics material, wherein said water gauge and said backing member are fixedly secured with each other, wherein said housing member contacts and is fixedly secured with said water gauge, characterized in that a sealing member is positioned between and in contact with said housing member, said backing member and said water gauge to thereby form a water-tight seal therebetween.

17. A kettle according to claim 16 wherein said sealing member further characterized in including an endless silicon rubber sealing ring.

18. A kettle according to claim 16 further characterized in that said metal is stainless steel.

19. A kettle according to claim 16 further characterized in that said plastics material is polypropylene.

20. A kettle according to claim 19 further characterized in that said water gauge and backing member are fixedly secured to each other by high frequency welding or hot-plate welding.

21. A kettle according to claim 16 further characterized in that said plastics material is polycarbonate.

22. A kettle according to claim 21 further characterized in that said water gauge and backing member are fixedly secured to each other by high frequency welding, hot-plate welding or ultra-sonic welding.

23. A kettle according to claim 16 further characterized in that said water gauge includes at least a channel member for receiving at least a ridge member of said backing member.

24. A kettle according to claim 16 further characterized in that said housing member includes at least a bent portion received within a cavity formed between said water gauge and said backing member.

25. A kettle according to claim 17 further characterized in that said housing member includes at least a stepped portion received within a cavity formed between said water gauge and said backing member.

26. A kettle according to claim 16 further characterized in that said sealing ring is substantially circular in cross section.

27. A kettle according to claim 16 further characterized in that said sealing ring is substantially rectangular in cross section.

28. A kettle according to claim 16 further characterized in that said sealing ring is substantially U-shaped in cross section with two arm members.

29. A kettle according to claim 28 further characterized in that said housing member includes at least a bent portion received in a space between the arm members of said sealing ring.

30. A kettle according to claim 29 further characterized in that said housing member includes at least a stepped portion received in a space between the arm members of said sealing ring.

* * * * *

UNITED STATES PATENT AND TRADEMARK OFFICE
CERTIFICATE OF CORRECTION

PATENT NO. : 6,355,911 B2
DATED : March 12, 2002
INVENTOR(S) : Tat Chan

It is certified that error appears in the above-identified patent and that said Letters Patent is hereby corrected as shown below:

<u>Title page,</u>
Item [73], please correct the name of the Assignee to -- Better Electrical Products (HK) Company Limited --.

Signed and Sealed this

Fifteenth Day of April, 2003

JAMES E. ROGAN
*Director of the United States Patent and Trademark Office*